United States Patent [19]

Ohsawa et al.

[11] 3,752,912

[45] Aug. 14, 1973

[54] SYSTEM FOR CONVERTING FACSIMILE SIGNALS

[75] Inventors: Hiroji Ohsawa, Kamakura; Kazuo Enosawa, Matsudo; Heijiro Hayami, Takatsuki; Kaoru Sasabe, Ikeda, all of Japan

[73] Assignees: Nippon Hoso Kyokai, Tokyo; Matsushita Electric Industrial Co., Ltd., Kadoma-shi, Osaka, Japan

[22] Filed: Nov. 23, 1970

[21] Appl. No.: 91,656

[30] Foreign Application Priority Data

Nov. 27, 1969 Japan ........ 44/96054
Nov. 28, 1969 Japan ........ 44/96379

[52] U.S. Cl. .......... 178/6, 178/DIG. 3, 178/6.6 DD, 179/15.55 TC

[51] Int. Cl. .......... H04n 7/12

[58] Field of Search .......... 178/DIG. 3, 6.6 A, 178/6.6 DD, DIG. 24; 179/15.55 R, 15.55 TC; 340/347 A–347 D, 172.5

[56] References Cited

UNITED STATES PATENTS

| | | | |
|---|---|---|---|
| 3,526,900 | 9/1970 | McCoy | 178/6.6 DD |
| 3,586,767 | 6/1971 | Morchand | 178/6.6 DD |
| 3,006,991 | 10/1961 | Cherry | 178/DIG. 3 |
| 3,181,074 | 4/1965 | Cotterill | 179/15.55 R |
| 3,217,103 | 11/1965 | Lien | 178/6.6 A |
| 3,639,695 | 2/1972 | Bertheas | 179/15.55 R |
| 3,202,264 | 8/1965 | Adams et al. | 179/15.55 R |

*Primary Examiner*—Robert L. Griffin
*Assistant Examiner*—Joseph A. Orsino, Jr.
*Attorney*—Stevens, Davis, Miller & Mosher

[57] ABSTRACT

A system for converting facsimile signals, in which an analog facsimile signal is sampled, the sampled signal is compressed into a plurality of intermittently arranged pulse bundles, and the intermittent pulse bundles are converted into a continuous pulse train. The continuous pulse train thus produced is converted into a high frequency signal such as a television signal.

8 Claims, 10 Drawing Figures

H. OHSAWA,
K. ENOSAWA,
H. HAYAMI AND
K. SASABE
INVENTORS

BY Stevens, Davis, Miller & Mosher
ATTORNEYS

DISTRIBUTION OF INFORMATION OVER VSR SHEET

SYSTEM FOR CONVERTING FACSIMILE SIGNALS

This invention relates to signal conversion systems, in which an analog facsimile signal is sampled to produce a sampled pulse train, the sampled pulse train is divided into a plurality of uniform divisions and compressed divisions by compressing the pulse width to produce a plurality of intermittent pulse bundles, and the intermittent pulse bundles are converted into a continuous compressed pulse train.

The display of color facsimile pictures on color television sets has heretofore been accomplished in a manner as illustrated in FIG. 1 of the accompanying drawings. An original picture 101 is transmitted from an on-the-spot color facsimile transmitter to a color facsimile receiver 102 provided in the central television station. The color facsimile receiver 102 produces a hard copy 103 of the original picture for braodcasting through conventional color television camera 104. The televised color facsimile picture is displayed on color television receiving set 105. It is the most significant problem in this conventional system that the formation of the hard copy 103 requires manual processes requiring trained personnel additionally. In another aspect, the formation of the temporary hard copy gives rise to some loss of color information from the color reproducing point of view. Further, the necessity of a color facsimile receiver requiring a color television system for the formation of the hard copy is another disadvantage. In a still further aspect, tape recorders are often utilized for the conversion of signals carrying facsimile picture information. In this case, the conversion ratio for the signal conversion is determined by the ratio between tape speed during recording and playback. These recorders may be effectively used where the conversion ratio is not large, with the output frequency of merely several times the input frequency. However, it is almost impossible to use these recorders where the required conversion ratio is large, with the output frequency of several kHz to several MHz or higher. As an alternative, one frame of picture information may be recorded in a memory unit and read out in 1/60 second. To store one frame of picture information, however, a memory capacity of four hundred thousand bits is required even in case of the black-and-white one-bit picture. In case of color picture information, a memory having a capacity of nearly three hundred million bits is necessary. Considering that even the presently marketed large-size computer has a memory capacity of only several tens of thousands to several hundreds of thousands of bits, the realization of a memory with a capacity of several hundred thousand bits is economically difficult.

It is an object of the invention to overcome the aforementioned drawbacks by the provision of a simplified signal converting system.

More particularly, it is an object of the invention to provide an entirely electronic signal converting system free from any hard copy and including a recording means constituted by a buffer memory having a slight capacity and delay lines.

According to the invention, the functions provided by the conventional equipment 102 to 103 in FIG. 1 is attained with a single signal conversion system 206 as shown in FIG. 2, through which the facsimile signals including color picture signals are converted into corresponding television signals.

The above and other objects, features and advantages of the invention will become more apparent from the following description having reference to the accompanying drawings, in which:

FIG. 1 outlines a typical example of the conventional television transmitting system;

FIG. 2 outlines a television transmitting system using a signal converting means embodying the invention;

Figure 4:
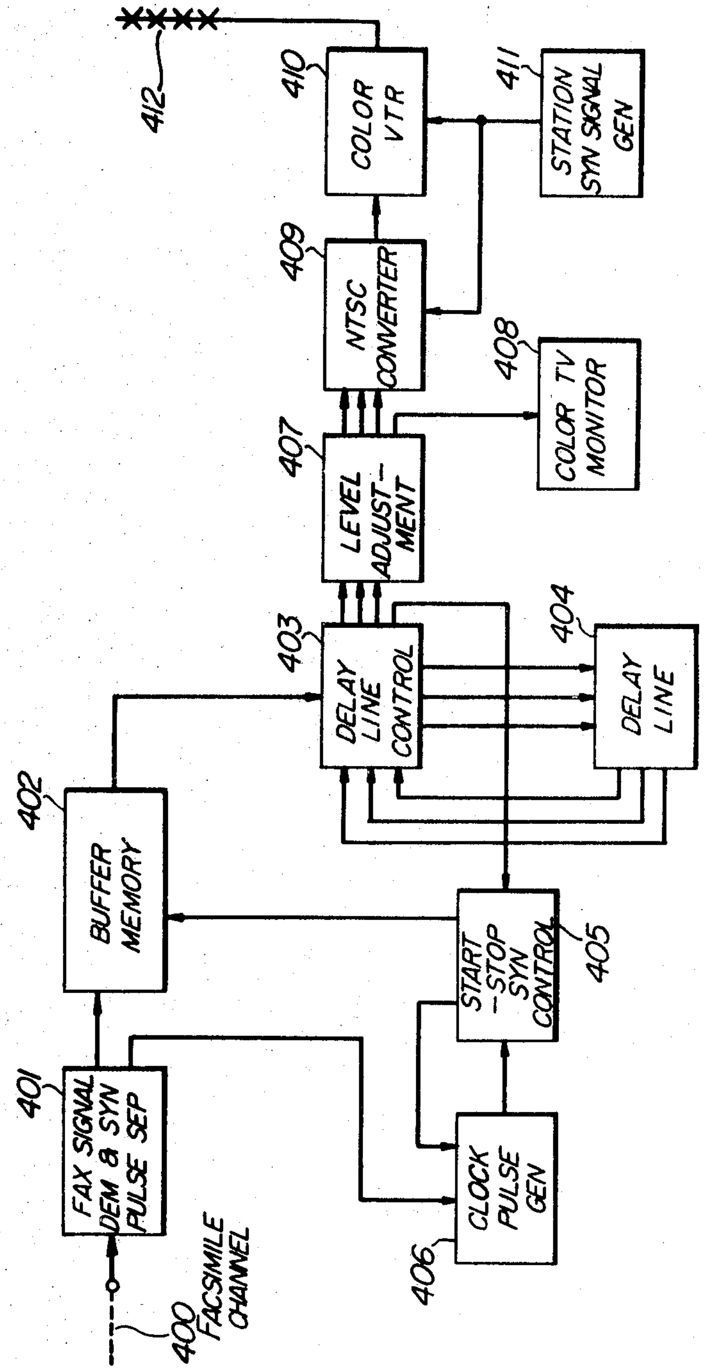
FIG. 4 is a block diagram showing an embodiment of the signal converting system according to the invention.
Figure 6:
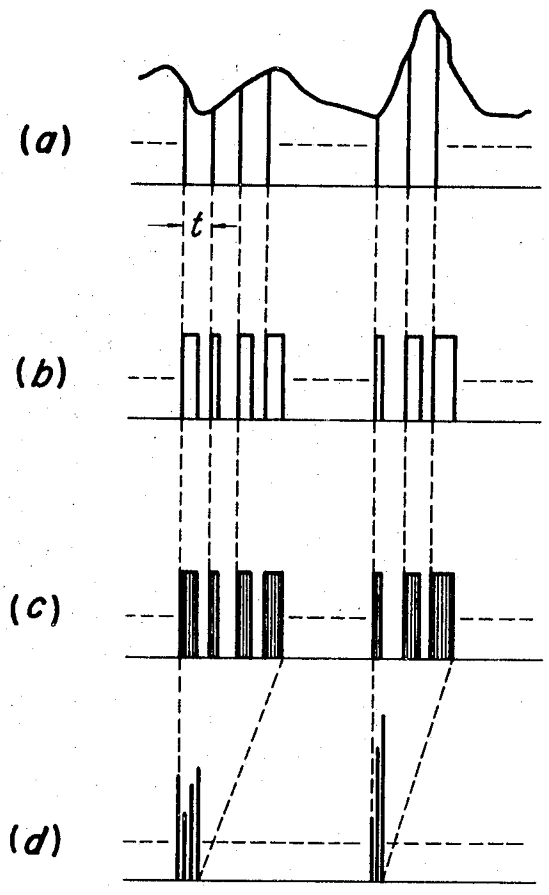
Figure 7:
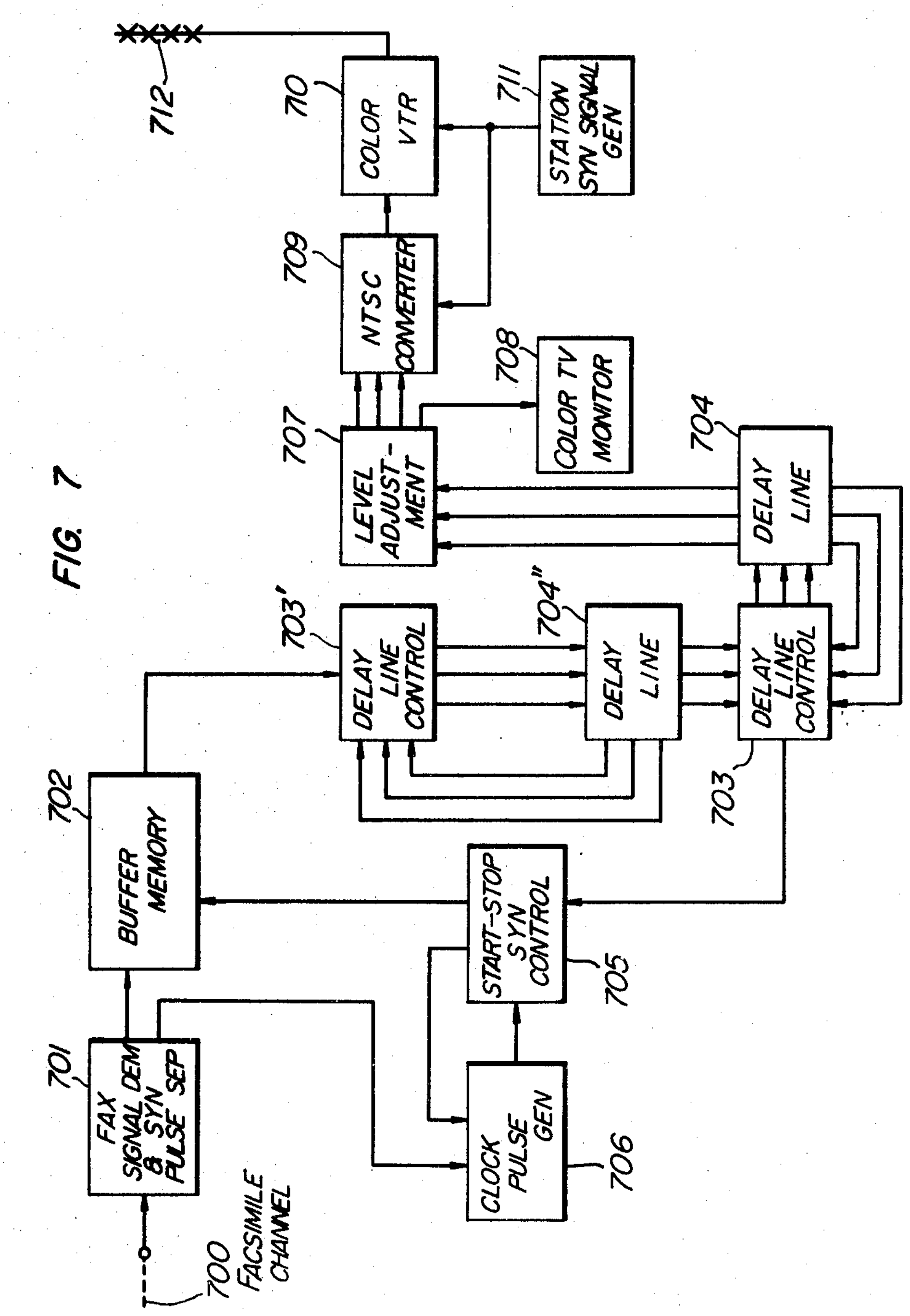
Figure 8:
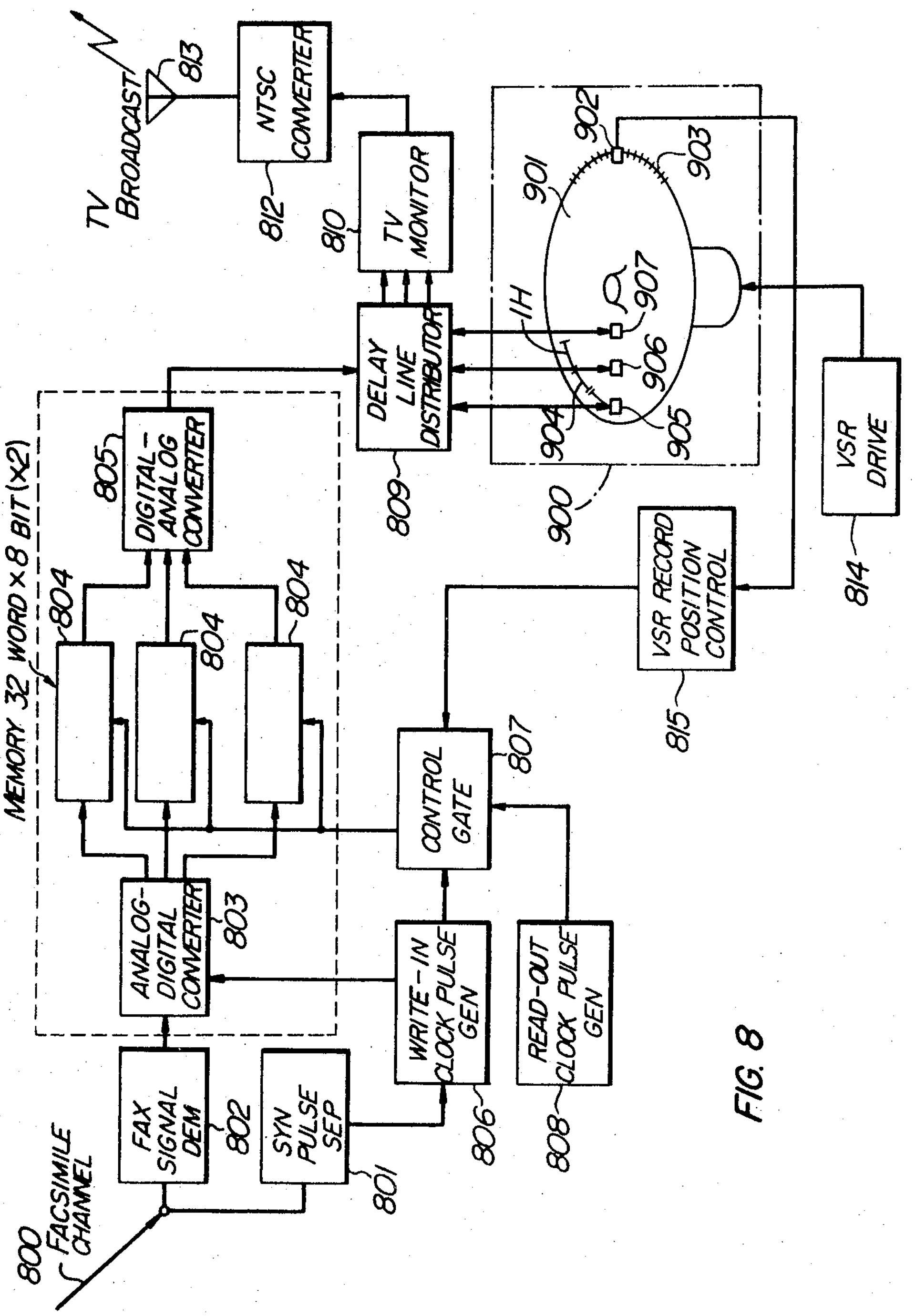
Figure 9:
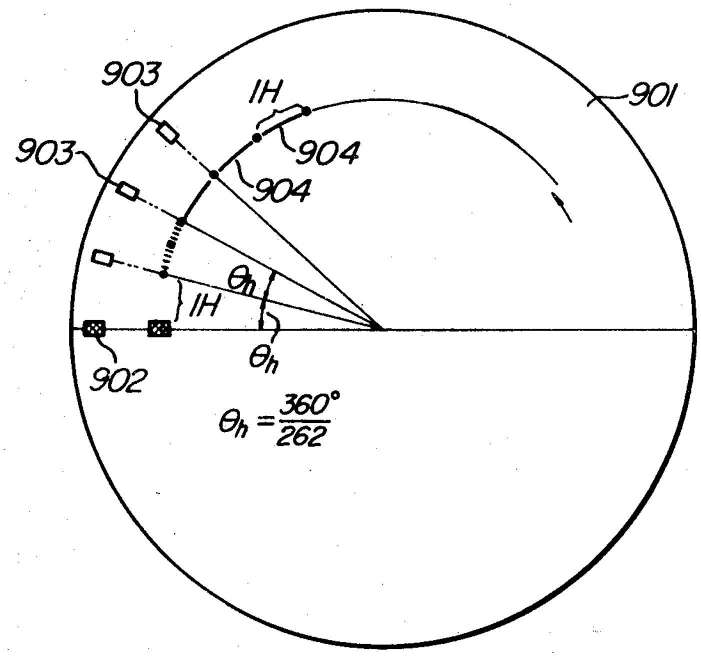

FIGS. *5a* and *5b* illustrate, mainly in block form, the system of FIG. 4 in detail;

FIG. 6 shows signals appearing at various parts of the signal converting system according to the invention;

FIG. 7 is a block diagram showing another embodiment of the signal converting system according to the invention;

FIG. 8 is a block diagram showing a further embodiment of the signal converting system according to the invention; and FIG. 9 shows the manner of distributing information over a VSR sheet in the system of FIG. 8.

Figure 1:
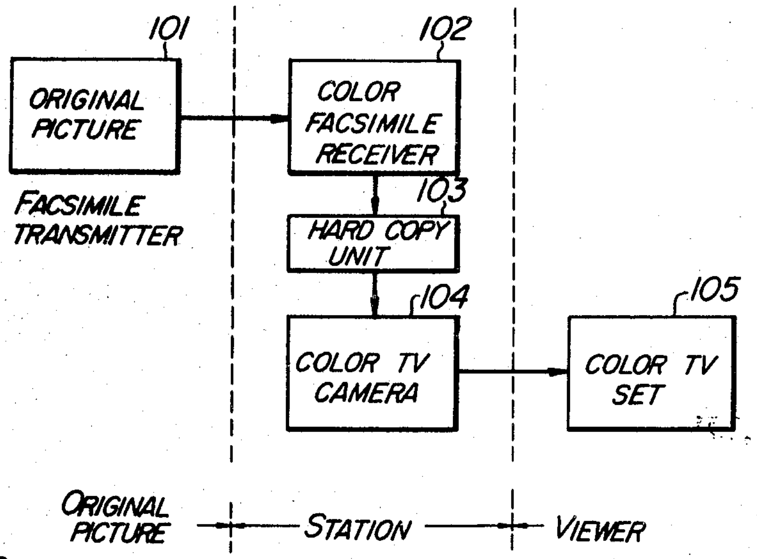
FIG. 1 PRIOR ART
Figure 2:
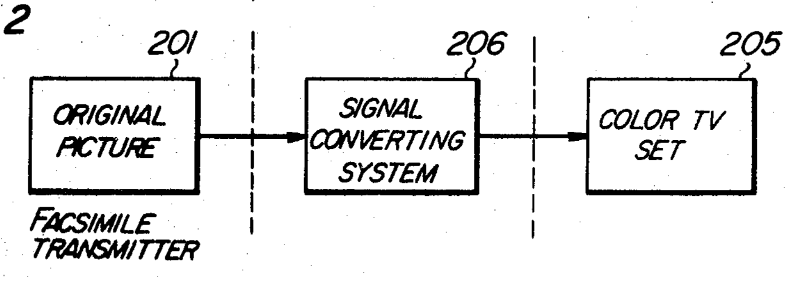
Figure 3:
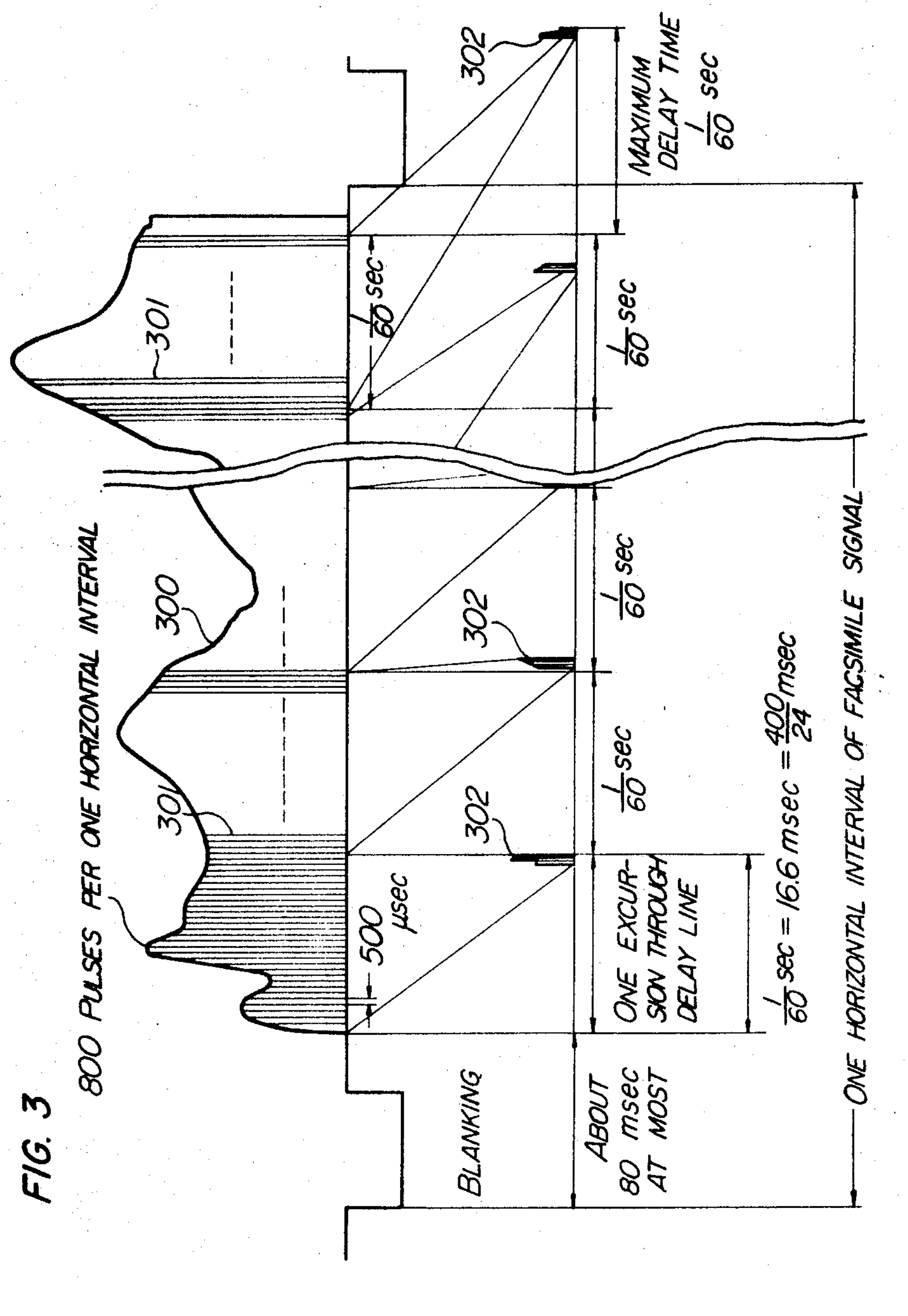
FIG. 3 is a representation of the operational principles underlying the invention.
Figure 5A:
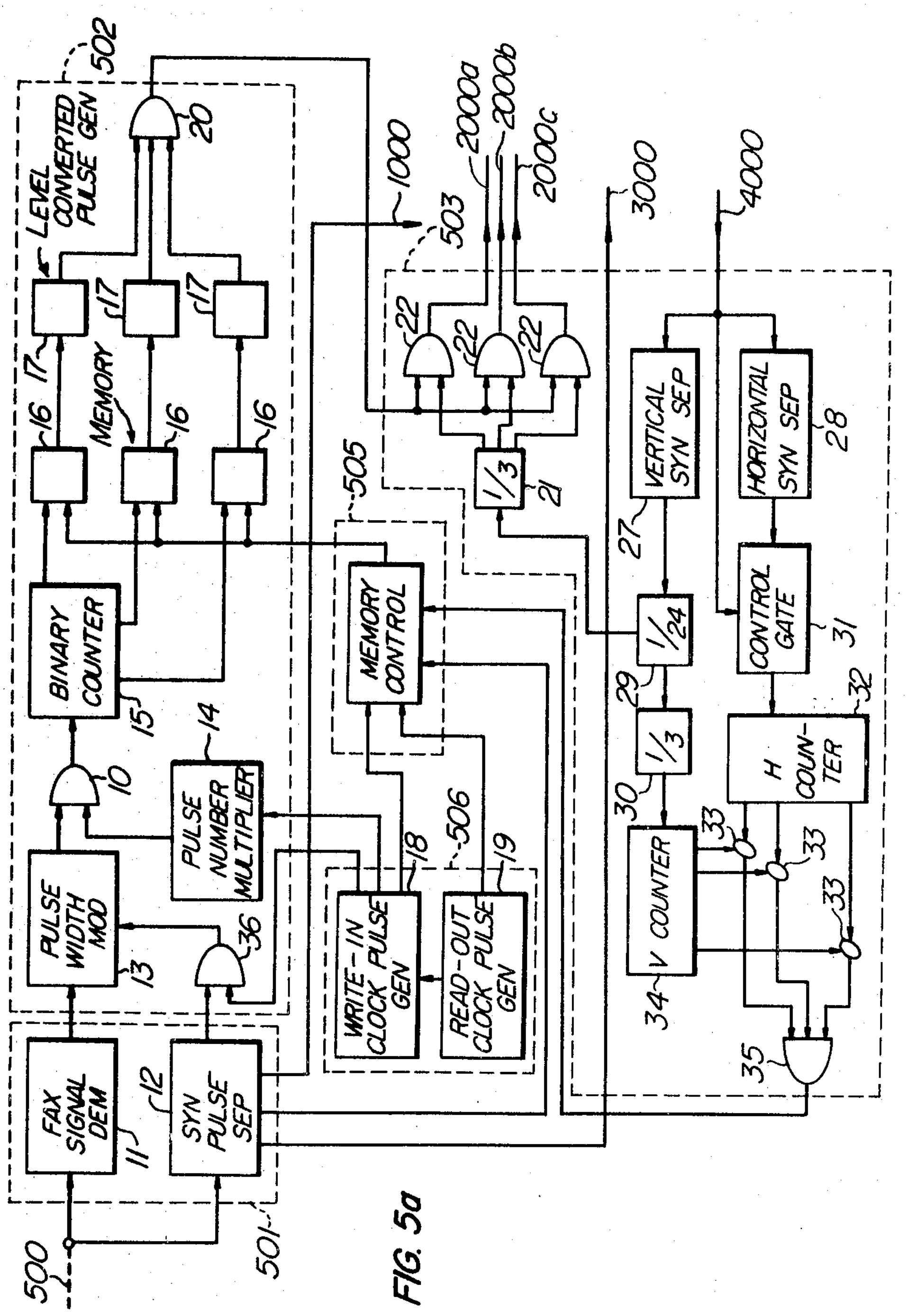

FIG. 2 shows a television transmitting system using a signal converting system 206 according to the invention. In the Figure, parts 201 and 205 respectively correspond to parts 101 and 105 in FIG. 1. The operational principles as shown in FIG. 3 are involved in the compression of a facsimile signal by a signal converting system embodying the invention. In FIG. 3, reference numeral 300 designates an analog facsimile signal in one horizontal line. This analog signal is sampled as typically indicated at 301. The sampled facsimile signal is compressed for each of uniform blocks or divisions, as indicated at 302. This step will be hereinafter detailed in connection with FIG. 5.

FIG. 4 shows an embodiment of the signal converting system according to the invention. Referring to the Figure, reference numeral 400 designates a facsimile circuit through which the facsimile signal is transmitted. The input facsimile signal is sampled. Numeral 401 designates a circuit to separate the picture element signal and the synchronizing signal from the input facsimile signal. The picture element signal separated from the input facsimile signal is recorded in a buffer memory 402. At this time, the input to the buffer memory 402 is time compressed for each of a suitable number of uniform divisions constituting one horizontal line interval of the facsimile signal to produce a compressed, intermittently arranged signal. The time processed, compressed and intermittently arranged signal from the buffer memory 402 is fed through a delay line control 403 to a delay line 404. The output signal from the buffer memory 402 is subjected to a predetermined phase shift. If it takes 1/60 second for the input to the delay line to proceed from the write-in end to the read-out end thereof, by arranging such that one horizontal line of the facsimile signal is compressed to be equal to one horizontal line of the television signal (63.5 $\mu$sec.) through the buffer memroy 402, that the compressed signal is written in the delay line 404 by introducing a phase shift for each horizontal line, and that the signal read out of the delay line 1/60 second after the writing-in is re-written in the delay line 404 through the delay line control 403, after 262.5 horizontal lines of the facsimile signal have been transmitted the delay line 404 is filled up, forming one field of the television signal. The reading-out of the information thus stored in the delay line will provide a video signal. In the case of a television system employing interlace, the same effects may be attained by forming two such fields, so the description of the interlace application is omitted here. The video signal produced in the manner described above is then fed through adjusting means 407 for level adjustment, color tone correction and so forth. The resultant signal may be fed to a color television monitor 408 for display of the reproduced picture, or it may be broadcast through a converter 409, for instance an NTSC converter in Japan, from an antenna 412. Also, it is possible to record and compile the video signal output of the convertor 409 by using a color VTR 410. To this end, a synchronizing signal source 411 is incorporated as the synchronizing system. Numeral 405 designates a start-stop synchronization control, and numeral 406 designates a clock pulse source providing write-in and read-out clock pulses to control the buffer memory 402.

Figure 5B:
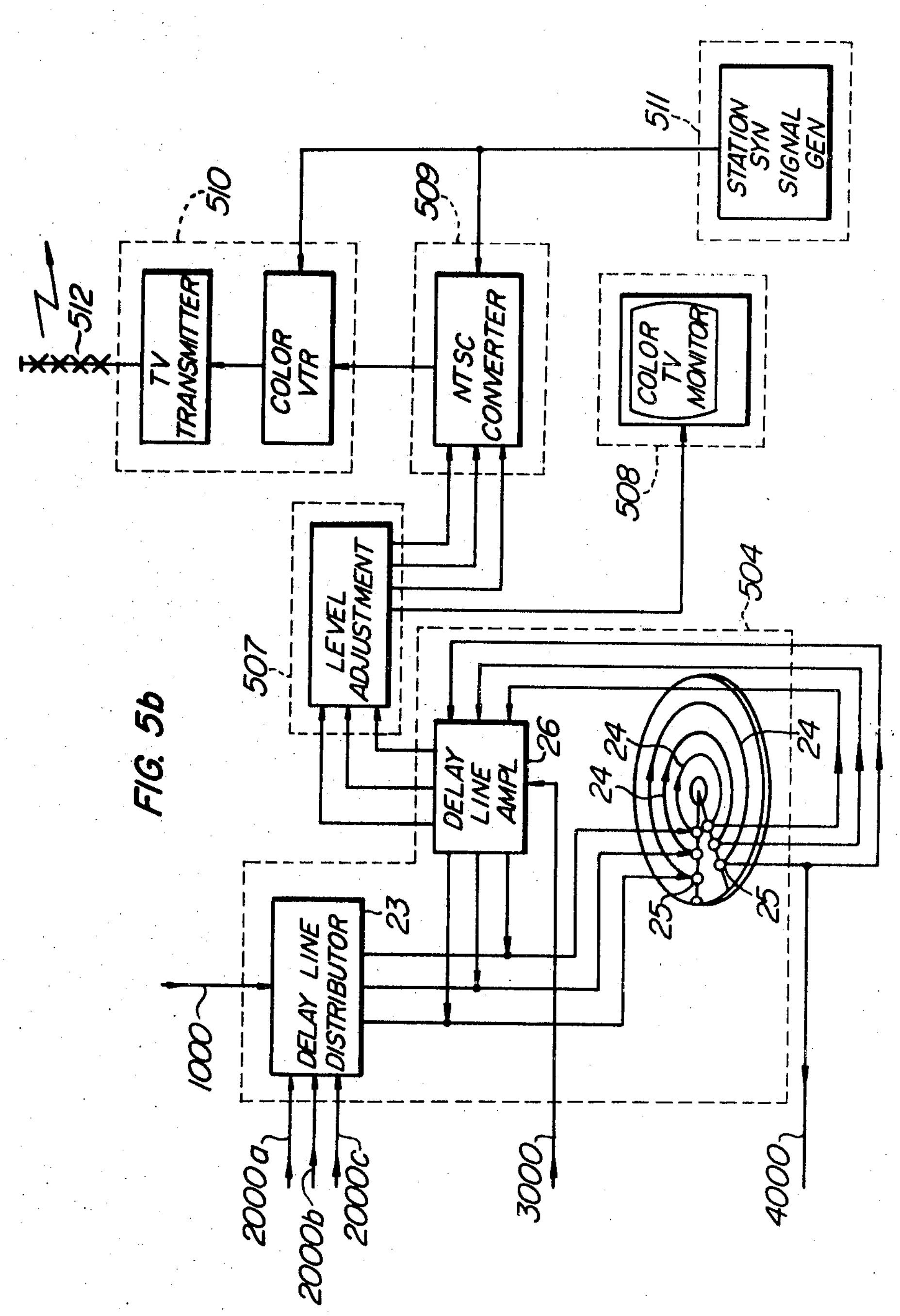

FIG. 5 illustrates the circuit of FIG. 4 in detail. In the Figure, parts 500 to 512 correspond respectively to parts 400 to 412 in FIG. 4. It is assumed that the transmission of one horizontal interval of facsimile signal takes 400 msec. In this embodiment, the 400-msec. signal train is compressed into one having a time interval of 1/60 second. However, the system may be designed to provide a suitable compression ratio.

Referring now to FIG. 5, demodulating separator 11 separates the picture element signal from the facsimile signal and a synchronizing signal separator 12 separates the synchronizing signal from the input facsimile signal. As is shown in FIG. 6, the picture element signal (a) is pulse-width modulated by a pulse width modulator 13 in accordance with the output pulses of a write-in clock pulse generator 18 for each sampling period into a pulse train (b). Meanwhile, the output of the write-in clock pulse generator 18 is pulse-number multiplied by a factor of 256 by a pulse number multiplier 14. The factor of 256 means that the shade or gradation of the video signal is quantized in terms of 256 steps. It is normally preset to a desired number. The outputs of modulator 13 and multiplier 14 are fed to an AND gate 10, causing it to produce intermittent pulse trains as shown at (c) in FIG. 6. The pulses in each pulse train, that is, the pulses contained in the pulse width of each output pulse of the pulse width modulator, are counted by a binary counter 15. Thus, the binary counter 15 produces a single binary digital signal representing the number of steps, from 0 to 256, for each output pulse of the pulse width modulator. An AND gate 36 serves to keep the synchronizing signal portion, blanking interval in FIG. 3, of the input facsimile signal free from modulation. In this embodiment, the binary counter 15 may be constructed from 8 flip-flops, for $2^8=256$. The output of the binary counter 15 is stored in 8 memories 16. Each memory 16 is capable of storing not only a single pulse, but it has a certain capacity. For instance, for the compression of 800 pulses as shown in FIG. 3 at one time a memory capacity of 800 pulses is required. When a predetermined quantity of signal is stored in the memories 16, the read-out signal pulse train is compressed at a high speed. The outputs of the individual memories are fed to respective level-converted pulse generators 17, which produce output signals at corresponding levels. The outputs of these generators are added together by an adder 20, which produces intermittent pulse trains or bundles individually occurring in respective uniform successive periods. The intermittent compressed output signal of the adder 20 is shown at (d) in FIG. 6.

The intermittent compressed signal thus produced is led through AND gates 22, which are on-off controlled from a distributor 21, to a delay line distributor 23, and is successively written in delay lines 24 for respective chromaticity signals through write-in couplers 25. The signal for one horizontal line video signal portion entering the delay lines proceeds in the direction of the arrows. The delay line distributor 23 has a role of distributing the input signal over the delay lines by successively switching it in accordance with the order of occurrence of the color signals in the facsimile signal transmitted. The signals proceeding through the delay lines are read out through read-out couplers 25, 1/60 second after their entering the delay lines. The output of a delay line amplifier 26 is repeatedly re-introduced into the write-in couplers 25 until 262.5 horizontal lines of the facsimile signal have been transmitted through the facsimile circuit 500 to fill up the delay lines with 1/60-second video signals. The signal having proceeded through the delay lines 24 is fed through a level adjustment means 507, and NTSC converter 509 before it is broadcast by a transmitting means such as VTR transmitter 510. Though the bundled video signal from the delay line distributor 23 makes a round trip through any of the delay lines 24 in 1/60 of a second, the writing-in should be delayed by 1 H = 63.5 μsec. with respect to the period of 1/60 second. Actually, one excursion does not always take the constant period of 1/60 second, but the excursion period is subject to fluctuations although to slight extents. Accordingly, the signal, which is read out of one memory 16 at each time the output of the relevant delay line 24 appears at the associated coupler 25, is delayed by 1 H (63.5 μsec.). In this manner, the overlapping of the bundled video signal in the delay line 24 is totally prevented to eliminate loss of information. It will be appreciated that in switching the couplers 25 in accordance with the order of occurrence of the color signals the outputs of the couplers 25 are made to coincide with the inputs to a delay line control generally designated at 503. In the illustrated embodiment, only one of the couplers 25 serves to control the outputs of the delay lines 24. The bunched video signal appearing at this control terminal is fed both to a vertical synchronizing signal separator 27 and to a horizontal synchronizing signal separator 28. The former separator separates the vertical synchronizing signal, which indicates the initiation of a series of signals, and the latter separator separates the horizontal synchronizing signal. The former changes the signal in 400-msec. interval into a train of intermittent compressed signals each occurring in a 1/60-second sub-interval, so that the video signal completes 24 excursions through the delay line 24. The output of the separator 27 is frequency divided by a 1/24 frequency divider 29, whose output signal is distributed by the distributor 21 to selectively feed the delay lines 24 corresponding to the respective colors. The distributor 21 is unnecessary for black-and-white or monochromatic pictures. When the picture transmitted involves three primary colors, the output of the frequency divider 29 is further frequency divided by a 1/3 frequency divider 30, and the resultant output is fed to a V counter 34 to produce the corresponding binary code output. Meanwhile, the output of the horizontal synchronizing signal separator 28 is gated for every excursion period by a control gate 31 to be fed to an H counter 32 for the binary coding. The V and H counters 34 and 32 feed a set of coincidence circuits 33. Each coincidence circuit provides output code "1" if both the input codes coincide, that is, if the input codes are either "0" and "0" or "1" and "1". An AND gate 35 takes AND of the outputs of the coincidence circuits 33 to produce timing pulses for the read-out in the memories 16. Information for 1 H portion stored in each memory should be read out in 63.5 μsec. The memories 16 are swept with read-out clock pulses from a read-out clock pulse generator 19 at one time. The signals thus read out are stored in the respective delay lines 24 through the couplers 25. As described before, when 262.5 lines of video signal have filled up the delay lines 24, they are ready for display on a television monitor set.

FIG. 7 shows a modification of the embodiment of FIG. 4. This embodiment is the same as the embodiment of FIG. 4 except that this embodiment uses two separate delay lines for each color signal. Thus, in FIG. 7, parts 700 to 711 correspond to the respective parts 400 to 411 in the embodiment of FIG. 1. In this modification, parts 703' and 704'' are incorporated in the embodiment of FIG. 4. In the embodiment of FIG. 4, for the time conversion of the facsimile signal memories capable of storing information for one horizontal line (400 msec.), that is, memories capable of storing 800 pulses, are used. With the construction of FIG. 7 the incorporation of separate delay line control 703' and separate delay lines 704'' enables reducing the memory capacity of the memory elements in the buffer memory unit 702 to about one-third as compared to the memories in the embodiment of FIG. 4. The ground for this will now be discussed by also having reference to FIG. 3. In case of FIG. 3, 800 samplings are made available in one horizontal line interval. The individual samplings at various levels are temporarily stored either in an analog unit or in the digital memory unit 702 as shown in FIG. 7. In case of using the digital unit, by reading out a bunch of pulses (substantially corresponding to 32 picture elements), which makes a round trip through the delay line in 1/60 second and is written in the memory in 1/60 second, in 1/60 × 1/24 second, a compressed bunched signal (as indicated at 302 in FIG. 3) corresponding to 32 picture elements is obtained for every 1/60 second. This signal is not directly fed to the delay line 704 but is temporarily fed to the buffer delay line 704''. The delay line 704'' provides a delay time of 1 H = 63.5 μsec. for the television system. This delay line is the one usually used in the PAL or SECAM television system. 1/24-H portions of video signal successively enters the delay line 704'', and the delay line 704'' is filled up when it has received 24 successive inputs, that is, it is filled up after 400 msec. The continuous video signal for 1 H thus stored is then transferred to the delay line 704. Thereafter, the same process as described in connection with FIG. 4 follows, thereby forming one field of a picture.

In the preceding embodiments, delay lines are used to convert intermittent compressed signal into continuous compressed signal. FIG. 8 shows a further embodiment, in which a video sheet recorder or video disc recorder (hereinafter referred to as VSR or VDR) is substituted for the delay lines. in FIG. 8, a video signal demodulator 802 and a synchronizing signal separator 801 respectively separate the video signal and the synchronizing pulse from the facsimile signal transmitted through transmission circuit 800. The video signal thus separated is converted by an analog-digital converter 803 (hereinafter referred to as ADC) into digital signals, which are stored in memories 804. In the embodiment of FIG. 8 the signal level is represented in terms of 256 steps, so that 8 memory elements are arranged in parallel to provide a memory capacity of 28 pulses, i.e., 8 bits. Also, the memories are capable of storing a plurality of 8-bit signal groups. For the simplest 1-bit picture where the picture element is either white or black such as newspaper printed characters, one row of memory elements suffices itself. Further, in place of these memory elements an analog memory means, for instance a capacitor row, may also be used to store the video signal. This method can dispense with the ADC 803 as well as a DAC 805, which is required in case of the digital memories to re-convert the memory output into the analog signal. When an analog memory is used instead of the digital memory above mentioned, the sampled facsimile signal is compressed into an intermittent video signal without using ADC and DAC. FIG. 8 is an example in case of using a digital memory.

For the sake of simplification, a television system without interlace is given by way of example. It is assumed that a VSR sheet 901 completes one rotation in 1/60 second, that is, its rotational speed is 3600 rotations per minute. This means that the VSR sheet completes 24 rotations in 400 msec., that is, from the initiation of a synchronizing pulse (or blanking interval) of the facsimile signal till the initiation of the next synchronizing pulse. Meanwhile, facsimile information corresponding to 262 rasters constituting one field of the television signal is intermittently recorded on the sheet 901 of the VSR 900 in a period of 262 times 400 msec. Of course, the phase of line 904 on the VSR sheet 901 should be successively shifted in synchronism with the appearance of the facsimile signal until 262 horizontal lines of the facsimile signal have been recorded on the sheet. During the transmission of one horizontal line of the facsimile signal the VSR sheet 901 is rotated 24 times. This means that a particular segment of one track on the VSR sheet 901 corresponding to one horizontal line of the facsimile signal and subtending an angle of 360°/262 is coupled 24 times during one horizontal line interval. Thus, where the 400-msec. facsimile horizontal interval is divided into 800 facsimile elements, 800/24 facsimile elements, i.e. approximately 32 elements, are transmitted during one rotation of the VSR sheet 901. The number of picture elements in one division of the facsimile horizontal line determines the resolution or quality of the television picture; the larger the number of picture elements the better the picture quality. From the standpoints of economy and practicability, however, 800 elements per one horizontal line is a reasonable compromise value. The fact that 32 elements are transferred onto the VSR sheet 901 during each rotation of the sheet 901 means that each memory 804 need have only 32 words. In this example (case), 800 facsimile elements divided into 24 blocks of 32 elements. The number of dividing blocks is not necessarily 24 blocks but may be arbitrarily designated. It is all right that 800 facsimile elements are compressed and transferred onto the VSR sheet 901 during every 24 rotation of the sheet 901 (in this case the number of the dividing block is one, and each memory 804 needs 800 words).

This provides memory simplification or reduction of memory capacity down to one-ten thousandth of the value required for storing one complete facsimile picture. The transfer of information to the VSR sheet 901 may be effectively carried out by using positioning pulses produced in accordance with the rotation of the sheet. This is because that by so doing the loss of information for 32 picture elements constituting one division of the facsimile horizontal line due to the overlapping of the head and tail of the information as a result of fluctuations of the rotational speed of the VSR sheet 901 is eliminated, so long as the positioning clock pulses are based upon the marks 903 on the VSR sheet 901. 262 such clock pulses are produced during one rotation of the VSR sheet 901 and are taken out through a read-out head 902. The position of the VSR sheet 901 is successively shifted upon each completion of the writing of one facsimile signal horizontal line in the track 904 by a VSR position control 815, which controls a control gate 807 controlling the registering of the facsimile signal in the memories 804 and the transfer of the stored signal to the VSR. For color picture transmission, such as when the color facsimile signal containing orderly repetitive red, green and blue color intelligence is transmitted through the facsimile circuit, the individual color signals are recorded on the respective three tracks formed on the VSR sheet 901 by switching recording heads 905, 906 and 907. During the playback, the entire video signal recorded on the VSR sheet 901 is continuously reproduced, producing one picture with 262 horizontal lines in 1/60 second. The control gate 807 of this embodiment corresponds to the memory control within the dashed line block 505 in FIG. 5*a*, and the control 815 is identical with the system consisting of elements 27 to 35 within the dashed line block 503. On the VSR sheet 901, 262 clock pulse position marks are provided and thus 262 clock pulses are produced during one rotation of the VSR sheet 901 as previously mentioned. Each clock pulse corresponds to the horizontal synchronizing signal. Additionally, a signal corresponding to the vertical synchronizing signal is recorded at the periphery of the VSR sheet 901 which is also taken out through the read-out head 902. These signals may be recorded mechanically or magnetically on the VSR sheet 901. Therefore, 262 horizontal synchronizing signals and one vertical synchronizing signal are obtained during one rotation of the VSR sheet 901. These signals are selected by the vertical synchronizing separator 27 and the horizontal synchronizing separator 28. In this embodiment, 262 horizontal lines of the facsimile signal are recorded on one circumference of the VSR sheet 901. That is, one horizontal line of 400 m sec. of the facsimile signal is compressed and recorded on the VSR sheet in 1 H length indicated at 904. Thus, after completion of recording one horizontal line of the facsimile signal until the next one horizontal line has been recorded the VSR sheet 901 rotates $3600 \times 400 \times 10^{-3}/60$, i.e., 24 times so that 24 vertical synchronizing signals may be obtained. In the case of a color facsimile signal, the three color signals are recorded on the respective three tracks formed on the VSR sheet 901, and therefore in order to take out each of the three color signal from one horizontal line of the facsimile signal and record it on the corresponding track, the VSR sheet 901 must rotate $24 \times 3$, i.e., 72 times so that 72 vertical synchronizing signals may be obtained through the head 902 during recording of one horizontal line of the facsimile signal. When the compressed one horizontal line interval of the facsimile signal is recorded on the VSR sheet 901, the recording must be controlled to shift the time when the recording is made by a period corresponding to 1 H indicated at 904 per once recording.

This controlling is carried out as follows. The signals taken out by the head 902 are fed to the control 815 through a line corresponding to the line 4000 in FIG. 5*a*, and the vertical synchronizing signals and the horizontal synchronizing signals are picked up by the separators 27 and 28, respectvely. For every recording of one horizontal line interval of the facsimile signal, 72 vertical synchronizing signals are picked up and fed to the V counter 34 through the 1/24 frequency divider 29 and the ⅓ frequency divider 30, so that the V counter 34 counts by one. Meanwhile, the H counter 32 successively counts 262 horizontal synchronizing signals. These counters 32 and 34 provide respective binary coded outputs which are fed to the coincidence circuits 33 to be compared with each other. Outputs of the coincidence circuits 33 are connected to the AND gate 35 which produces an output to control the memory control gate 807. Thus, the controlling of the recording time is carried out. The reproduced picture may be monitored on a color television monitor 810. Also, the reproduced picture may be broadcast through an NTSC converter as in Japan and United States. It is converted through PAL and SECAM systems in such nations as West Germany and France. The output of these converters may be broadcast as the electromagnetic wave from a transmitting antenna, or it may be wire broadcast. The main functions of the system of FIG. 8 are provided by the memories 804 and the VSR 900. Particularly, the timing of read-out of the memories 804 is determined by clock pulse position marks 903 on the VSR sheet 901. In addition to these clock pulses, write-in and read-out clock pulse generators 806 and 807 are used as auxiliary clock pulse sources to control the memories. The former clock pulse generator provides clock pulses for dividing the facsimile signal horizontal line into 800 picture elements and writing these elements in the memories 804. Its clock pulse frequency is several kHz. The latter generator 808 provides clock pulses for reading the stored information out of the memories. Its clock pulse frequency is several MHz. The difference between these clock pulse frequencies provide a signal conversion ratio which is extremely large compared to the conversion ratio available with the speed conversion of the usual tape recorders. Strict constant speed control of the rotation of the VSR sheet 901 is achieved through a VSR drive 814. However, the speed of the VSR sheet is still subject to very slight fluctuations. If the fluctuation exceeds 500 $\mu$sec., the sweeping of the memory to successively read out a bundle of picture elements, i.e., 32 picture elements, for 1/24 facsimile signal horizontal interval is impossible, resulting in interference between overlapped portions to degradate the picture quality. The limit of 500 $\mu$sec. mentioned above is the sampling pulse period for one picture element in case of dividing one facsimile signal horizontal line interval into 800 picture elements, as shown in FIG. 3. It is possible to allow deviations of up to 1/60 second by providing a separate set of 32-word memories in parallel with the previous memory set and interswitching these sets. Normally, however, such measure is unnecessary for the usual VSR, because it is possible to control the usual VSR sufficiently with deviations of up to 100 to 200 $\mu$sec. In case of the color facsimile signal, a distributor 809 successively switches three heads 905, 906 and 907.

The manner of distribution of information over the VSR sheet 901 is shown in detail in FIG. 9. The VSR sheet 901 is provided with clock pulse marks 903 for causing its support drum to produce clock pulses. The clock pulses are taken out through the head 902. The clock pulse marks 903 are 262 in number for the television system without interlace as in the instant embodiment. These marks are uniformly spaced along the entire periphery of the VSR sheet 901, the segment between two adjacent marks subtending an angle $\theta_h$ of 360°/262. Thus, information for one facsimile signal horizontal line is recorded in the segment between two adjacent marks 903 subtending angle $\theta_h$. More particularly, 32 facsimile signal picture elements are recorded in a 1/24 division of one segment. Thus, with 24 rotations of the VSR sheet, information for one facsimile signal horizontal line is recorded in one segment subtending the angle $\theta_h$. In this manner, 262 horizontal lines of picture information is successively recorded on the VSR sheet 901, one horizontal line in one segment, thus recording one frame of picture information on the sheet. In case of the television system with interlace, 525 clock pulse marks 903 are required on the sheet, and the facsimile signal should be divided into 252 horizontal lines. In the foregoing embodiments, one horizontal line interval is divided into 24 sub-intervals. The number of sub-intervals in one horizontal line interval, however, is by no means fixed to 24, but it is determined as a function of the time required for the transmission of the facsimile signal.

As a further alternative, storage tubes may be employed in place of delay lines or recording means to convert intermittent compressed signal into continuous compressed signal.

As has been described in the foregoing, according to the invention the facsimile signal is not recorded at one time for each horizontal line, but a subdivision of one horizontal line is recorded at one time, so that the number of required memory elements is greatly reduced. Also, the television display of the facsimile picture signal through a totally automatic, electronic system without temporarily producing any hard copy of the transmitted facsimile signal is possible. Further, the television display of the facsimile signal transmitted through low frequency transmission lines such as telephone line is greatly simplified. Furthermore, the facsimile signal for only one frame of the original picture is necessary for the display of replication of the original on a television receiving set.

What is claimed is:

1. A system for converting facsimile signals comprising: means for sampling the facsimile signal, first storing means for storing the sampled signal, first controlling means for controlling the rate of writing and reading of the sampled signal in and out of said first storing means thereby compressing the sampled signal every predetermined interval to produce intermittently arranged compressed signals, second storing means comprising a circulating circuit, and second control means for controlling the time of insertion of said intermittently arranged compressed signals into said circulating circuit, said second storing means receiving said intermittently arranged compressed signals at the controlled time, circulating said intermittently arranged compressed signals so as to form a continuous compressed signal and storing said continuous compressed signal.

2. A system according to claim 1, wherein said second storing means includes at least one delay line.

3. A system according to claim 1, wherein said second storing means consists of a magnetic disc.

4. A system according to claim 3, wherein said magnetic disc is provided in the circumferential direction thereof with clock pulse marks representing clock positions in the circumferential direction and each producing a clock pulse signal, and said second controlling means controls the time of insertion of said intermittently arranged compressed signals into said magnetic disc by controlling the writing and reading times of the sampled signal in and out of said first storing means in response to said clock pulse signal.

5. A system according to claim 1, wherein said system further comprises means for coding said sampled signal to be applied to said first storing means and means for decoding the coded intermittently arranged compressed signals read out of said first storing means, said second storing means storing the continuous compressed signal resulting from circulating said decoded intermittently arranged compressed signal inserted into said circulating circuit at the controlled time.

6. A system according to claim 5, wherein said second storing means includes at least one delay line.

7. A system according to claim 5, wherein said second storing means consists of a magnetic disc.

8. A system according to claim 7, wherein said magnetic disc is provided in the circumferential direction thereof with clock pulse marks representing clock positions in the circumferential direction and each producing a clock pulse signal, and said second controlling means controls the time of insertion of said intermittently arranged compressed signals into said magnetic disc by controlling the writing and reading times of the sample signal in and out of said first storing means under receipt of said clock pulse signal.

* * * * *